United States Patent
Liebenow

[11] Patent Number: 5,881,318
[45] Date of Patent: Mar. 9, 1999

[54] KEYBOARD AUDIO CONTROLS FOR INTEGRATED CD-ROM PLAYERS

[75] Inventor: Frank Liebenow, Greer, S.C.

[73] Assignee: Gateway 2000, Inc., North Sioux City, S. Dak.

[21] Appl. No.: 678,523

[22] Filed: Jul. 9, 1996

[51] Int. Cl.[6] .................................................. G06F 13/10
[52] U.S. Cl. ............................................................ 395/887
[58] Field of Search .................................... 395/887, 835, 395/825

[56] References Cited

U.S. PATENT DOCUMENTS

| | | | |
|---|---|---|---|
| 4,514,726 | 4/1985 | Whetstone et al. | 340/710 |
| 4,931,781 | 6/1990 | Miyakawa | 340/706 |
| 4,937,778 | 6/1990 | Wolf et al. | 364/900 |
| 4,994,795 | 2/1991 | MacKenzie | 340/710 |
| 5,038,279 | 8/1991 | Bertram et al. | 364/200 |
| 5,056,057 | 10/1991 | Johnson et al. | 364/900 |
| 5,173,940 | 12/1992 | Lantz | 380/25 |
| 5,186,629 | 2/1993 | Rohen | 434/114 |
| 5,197,147 | 3/1993 | Long et al. | 395/500 |
| 5,214,421 | 5/1993 | Vernon et al. | 340/825.03 |
| 5,305,449 | 4/1994 | Ulenas | 395/500 |
| 5,327,161 | 7/1994 | Logan et al. | 345/157 |
| 5,331,337 | 7/1994 | Kabeya et al. | 345/172 |
| 5,369,771 | 11/1994 | Gettel | 395/750 |
| 5,392,386 | 2/1995 | Chalas | 395/155 |
| 5,404,321 | 4/1995 | Mattox | 364/709.01 |
| 5,550,562 | 8/1996 | Aoki et al. | 345/163 |
| 5,563,628 | 10/1996 | Stroop | 345/156 |
| 5,586,324 | 12/1996 | Sato et al. | 395/887 |
| 5,608,895 | 3/1997 | Lee | 395/500 |
| 5,623,261 | 4/1997 | Rose | 341/26 |

FOREIGN PATENT DOCUMENTS

| | | |
|---|---|---|
| 0 596 594 | 5/1994 | European Pat. Off. ....... G06K 11/18 |
| 0602947 | 6/1994 | European Pat. Off. . |
| 29615333 | 10/1996 | Germany . |
| WO96/06486 | 2/1996 | WIPO . |

OTHER PUBLICATIONS

"Mouse with Ears", Reproduced from Research Dislcosure, No. 332, Kenneth Mason Publications Ltd, England, 1 page, (Dec. 1991).

Duncan, R., "An Examination of DevHlp API; writing OS–2 bimodal device drivers", *Microsoft Systems Journal, vol. 3, No. 2, p. 39*, 11 pages, (Mar. 1988).

Messmer, H., "The Indispensable PC Hardware Book—Your Hardware Questions Answered", *Second Edition, Addison–Wesley Publishing Company*, (1995).

(List continued on next page.)

*Primary Examiner*—Glenn A. Auve
*Attorney, Agent, or Firm*—Schwegmen, Lundberg, Woessner & Kluth, P.A.; Anthony Claiborne

[57] ABSTRACT

A computerized system for keyboard control of compact-disc read only memory (CD-ROM) audio of a computer. The computer has a CD-ROM player, a, computer keyboard and a basic input/output system (BIOS). The CD-ROM player is receptive to an audio compact disc (CD). The keyboard has a plurality of keys for entry of one or more predetermined sequences of one or more keystrokes by a user of the computer, each predetermined sequence corresponding to an audio function of the CD-ROM player. The BIOS is operatively coupled to the CD-ROM player and the keyboard, and in response to detecting a predetermined sequence of keystrokes entered by the user on the keyboard operatively signals the CD-ROM player to execute a corresponding audio function. In a further embodiment, the system also comprises an operating system and a CD-ROM control application. The operating system receives a command sent by the BIOS in response to detecting a predetermined sequence of keystrokes entered by the user on the keyboard. The control application receives the command from the operating system and in response signals the CD-ROM player to execute the corresponding audio function.

45 Claims, 3 Drawing Sheets

OTHER PUBLICATIONS

"Multimedia: Panasonic introduces multimedia notebook PC with Pentium 90 MHz CPU", *EDGE: Work–Group Computing Report, vol. 6; No. 270; p. 21,* EDGE Publishing, 5 pgs, (Jul. 24, 1995).

"Panasonic notebook has internal CD–Rom drive", *Newsbyte News Network,* 2 pgs, (Sep. 21, 1994).

"Toshiba delivers first mobile Pentium notebook computer", *Business Wire; Section 1, p. 1,* 4 pgs, (Oct. 10, 1994).

S. Hildreth, "Discuit: Vl.4 Compact Disc Player", *America Online; File: DISC104.ZIP, Apr. 18, 1996,* 1 pg, (Nov. 29, 1995).

R. Knize, "SUPERCD: Super CD v2.5 Music CD Player", *America Online; File DUPRCD@$.ZIP, Apr. 18, 1996,* 2 pgs, (Feb. 17, 1996).

C. G. Moon, "PROCD: V5.05 CD Music Player", *America Online; File: PROCD505.EXE, Apr. 18, 1996,* 2 pgs, (Jun. 22, 1994).

KEYBOARD AUDIO CONTROLS FOR INTEGRATED CD-ROM PLAYERS

FIELD OF THE INVENTION

This invention relates generally to keyboard control of compact-disc read only memory (CD-ROM) audio of a computer, and more particularly to such keyboard control through the basic input/output system (BIOS) of the computer.

BACKGROUND OF THE INVENTION

Because of the increasing interest in multi-media applications for computers, computers typically now come installed with compact disc-read only memory (CD-ROM) drives. Such drives generally allow computer users to play video and audio clips residing on CD-ROMs, the clips requiring such a large amount of storage space that frequently the only storage medium feasible to hold them is a CD-ROM. In addition, most drives allow as an added benefit for users to play audio compact discs (CDS). In this manner, a user can utilize his or her computer as an audio system, playing compact discs in the background while using the computer.

However, CD-ROM drives installed in computers typically do not have the variety of audio function buttons usually found on dedicated audio compact disc players for use with stereo systems. Most dedicated audio compact disc players include buttons to control the playing of an audio compact disc, corresponding to such functions as eject, play, stop, next track, previous track, fast forward and fast backward. Conversely, CD-ROM drives typically only include an eject button. Manufacturers of CD-ROM drives therefore expect users to control the playing of an audio compact disc drive through the computer in which the drive is installed.

Previous solutions for computer control of audio compact discs have generally focused on stand-alone or terminate-and-stay-resident providing such functionality. For example, a user of a PC-compatible computer running Microsoft Windows 3.11 or 95 brand operating system may load a stand-alone program from a hard disk drive into memory. The program has an associated window, providing buttons that the user can click to perform corresponding audio controls (eject, play, stop, etc.). Alternatively, the program provides keyboard equivalents to the buttons, so that the user can press certain key combinations to perform the audio control functions.

These programs have several major drawbacks. The programs are usually specific to a particular operating system. A program written specifically for Microsoft Windows 3.11 or 95 brand operating system could not be used if only Microsoft Disk Operating System (MS DOS) is running. Furthermore, the program may be incompatible with other programs also running on the computer. The program is also usually not immediately operative when the user turns the computer on; rather, the user must specifically load the program into memory every time the computer is used. Most significantly, such audio control programs must be the active program in order to work. For example, a user who loads such an audio control program into Windows 95 brand operating system and then subsequently loads another program has to first re-select the audio control program (e.g., selecting its task button in the task bar) before being able to use it. This is inconvenient for the user at best.

Another type of solution, terminate-and-stay-resident programs, fixes this last shortcoming, but does not alleviate the others. Terminate-and-stay-resident programs are also loaded into the memory of a computer from a storage device such as a hard disk drive. However, they operate at a lower level within the operating system than do stand-alone audio control programs; therefore, they are active all the time. This means that upon being loaded into the computer, the programs are always amenable to user input regardless of what other programs are also being run. Thus, a user who is running a word processing program can, in the middle of text entry, type a key sequence specific to the terminate-and-stay-resident control program to perform audio control commands. The user does not have to first activate the terminate-and-stay-resident program.

Terminate-and-stay-resident programs, however, share many of the shortcomings of the higher-level stand-alone audio control programs. They generally are specific to a particular operating system, and cannot be used with a different operating system running on the same computer. Furthermore, such programs are known to be incompatible with other programs, limiting their usefulness. In addition, these programs require the assignment of key sequences that are not used by other applications. Finally, the user of a terminate-and-stay resident program typically must load it into memory every time the computer is turned on. This takes up valuable lower or base memory (i.e., the lowest 640 kilobytes of random-access memory in a PC-compatible computer).

There is a need, therefore, for providing for control of audio functions of an audio compact disc inserted into a CD-ROM drive of a computer that is not specific to any particular operating system that may run on the computer. There is a further need for providing such control in a manner that is compatible with other programs that may also be running on the computer at the same time. There is also a need for providing control of audio functions such that control is automatically and immediately enabled when a computer is turned on. There is in addition a need for providing control of audio functions that does not take up base memory. Finally, there is a need to provide such control in a manner that is active to the computer user at all times.

SUMMARY OF THE INVENTION

This invention relates to keyboard control of compact disc-read only memory (CD-ROM) audio of a computer. In one embodiment of the invention, a computer comprises a CD-ROM player, a keyboard, and a basic input/output system (BIOS). The BIOS recognizes one or more predetermined sequences of keystrokes, each corresponding to an audio function of the CD-ROM player. In response to detecting one of the predetermined sequences, the BIOS signals the CD-ROM player to execute the corresponding audio function.

In this manner, the present invention allows for a number of advantages over the prior art. First, because keyboard control is implemented within the BIOS of a computer, it is not dependent on any particular operating system. In addition, the present invention is not a computer program executed by the operating system, and therefore cannot conflict with any program within memory that is executed by the operating system. That is, the present invention is executed at a very low level within the computer architecture (the BIOS) to avoid conflicts with programs. Further, as part of the BIOS the present invention does not take up scarce base memory of the computer.

Finally, the present invention allows for immediate and automatic access to keyboard control of the audio functions of the CD-ROM player. The BIOS of a computer is active automatically as soon as a user turns on the computer. The user, therefore, does not have to specifically load a program into memory in order to activate the present invention. Thus, the present invention is active at all times. The user, for example, does not have to click on a task button on a task bar prior to using the present invention.

In a further embodiment of the invention, the computer also includes an operating system and a CD-ROM control application. The operating system receives a command sent by the BIOS in response to detecting a predetermined sequence of keystrokes and looking up the corresponding scan code in a look-up table. The application then receives the command from the operating system, and in response signals the CD-ROM player to execute the corresponding audio function.

In another embodiment of the present invention, a BIOS comprises detecting means and signaling means. The detecting means detects the predetermined sequences of keystrokes entered by the user on the keyboard, and which correspond to audio functions of the CD-ROM player. The signaling means then operatively signals the CD-ROM player to execute the audio function corresponding to the predetermined sequence detected by the detecting means.

Other embodiments of the invention include a computer having such a BIOS, as well as a method comprising the steps of detecting a predetermined sequence of keystrokes entered by a user on a keyboard, and signaling a CD-ROM player to execute the audio function corresponding to the detected sequence. Still other and further aspects and advantages of the present invention will become apparent in the following description and by reference to the accompanying drawings.

DETAILED DESCRIPTION OF THE DRAWINGS

Figure 1:
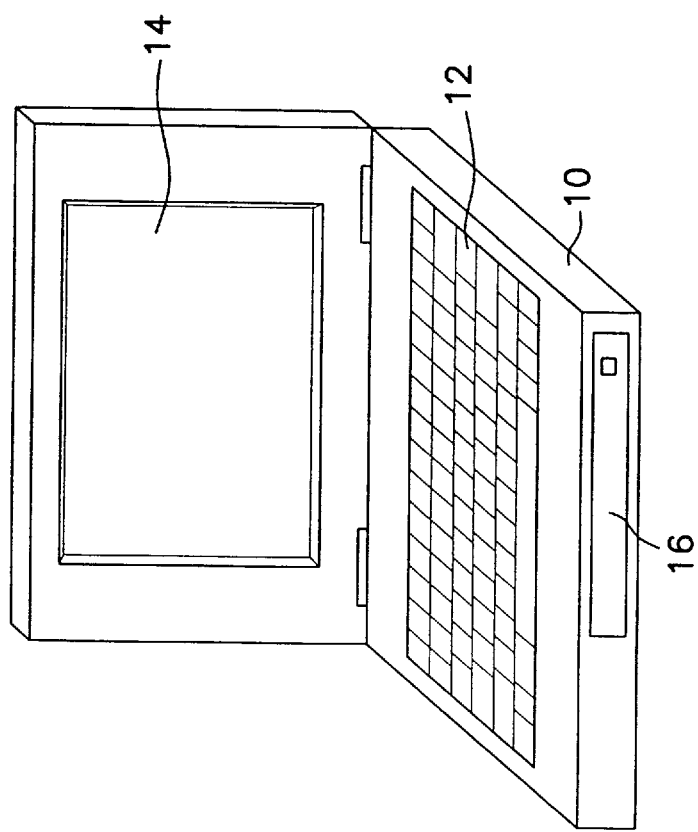
FIG. 1 is a diagram of a computer in which the present invention typically is implemented.

The present invention effects keyboard control of compact disc-read only memory (CD-ROM) audio of a computer. The present invention is not limited as to the type of computer on which it operates. However, a typical example of such a computer is shown in FIG. 1. Computer 10 is a laptop computer, and may be of any type, including a Gateway Solo, etc. Computer 10 usually includes keyboard 12, display device 14 and CD-ROM player 16. Display device 14 can be any of a number of different devices, including liquid crystal displays (LCDs), gas plasma displays, etc. CD-ROM player 16 as shown in FIG. 1 resides within computer 10, and thus is an internal player. However, the present invention is applicable to an external CD-ROM player connected to the computer by a cable. Furthermore, CD-ROM player can be a single-disk player, or a multi-disk player, as those of ordinary skill in the art are well aware. Moreover, computer 10 could be a desktop computer instead of a laptop computer, without departing from the spirit of the invention. Not shown is that computer 10 typically also comprises a random-access memory (RAM), a read-only memory (ROM), a central-processing unit (CPU), a fixed storage device such as a hard disk drive, and a removable storage device such as a floppy disk drive.

Figure 2:
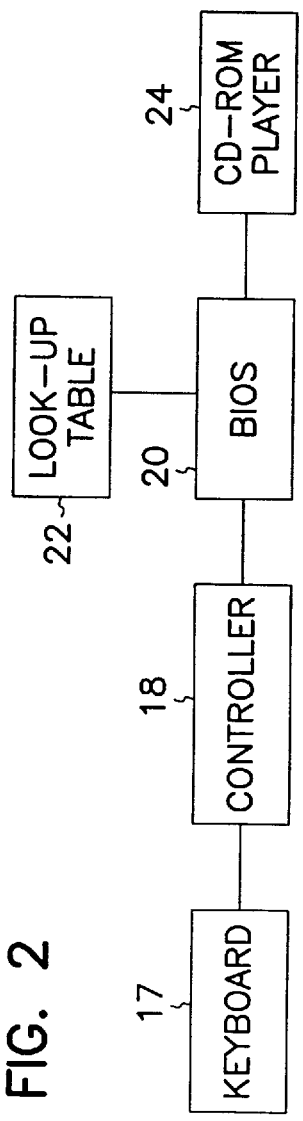
FIG. 2 is a block diagram of one embodiment of the present invention.

Referring now to FIG. 2, a block diagram of one embodiment of the present invention is shown. Keyboard 17 is coupled operatively to keyboard controller 18. Keyboard controller 18 is operatively coupled to BIOS 20, which itself is operatively coupled to look-up table 22 and CD-ROM player 24. As those skilled in the art will readily appreciate, the block diagram of FIG. 2 does not disclose the physical devices in which the various components of the block diagram reside. For example, controller 18 typically resides within the computer, as does BIOS 20 and look-up table 22 (e.g., computer 10 in FIG. 1). Player 24 in one embodiment is internal and resides within the computer, whereas in another embodiment of the invention it is external to the computer. The present invention is not limited to any particular component residing in any particular physical device.

Controller 18 is a keyboard controller, typically an integrated circuit (IC) such as the Intel 80C51SL. In one embodiment, controller 18 resides within the computer. Controller 18 constantly scans circuits leading to the key switches of the individual keys within keyboard 17. It detects the increase or decrease in current from the key that has been pressed. By detecting either an increase or a decrease in current, the controller can tell both when a key has been pressed and when it has been released. Each key has a unique set of codes associated with the key.

As those skilled in the art understand, these codes are known as scan codes. There are two scan codes for each key, one for when the key is depressed and the other for when the key is released. When a user presses or releases a key, controller 18 stores the associated scan code in its buffer, and then signals BIOS 20 via an interrupt request, typically IRQ 1, that it has a scan code waiting in its buffer. BIOS 20 then receives this scan code from controller 18. Upon receiving the scan code, BIOS 20 instructs controller 18 to delete the scan code from its buffer.

As those skilled in the art understand, BIOS 20 is a Basic Input/Output System, which is a set of programs typically installed in the ROM of a computer and which provides the most basic control and management of the computer's hardware. In another embodiment of the invention BIOS 20 is installed in the hard disk drive of the computer. As those skilled in art can appreciate, the BIOS can reside on any computer-readable storage device, such as a hard disk, floppy disk, removable tape cartridge, etc., without departing from the scope of the invention. Upon the computer being booted, BIOS 20 is typically transferred into RAM, and it is this copy of the BIOS that typically is used to provide the basic control and management of the computer's hardware. As compared to the other levels of software of a computer (operating system and stand-alone programs), the BIOS is the bottom-most software layer in the computer. It functions as the interface between the hardware and the other layers of software, isolating them from the details as to how the underlying hardware is actually implemented. Thus, the underlying hardware can change without affecting the higher level software.

BIOS 20, upon receiving a scan code from controller 18, then determines if the scan code corresponds to one of the ordinary shift keys or one of the keys that are considered to be special shift keys and toggle keys—CTRL, ALT, NUM LOCK, CAPS LOCK, SCROLL LOCK, FUNCTION, INSERT, etc. If the scan code corresponds to one of the latter keys, BIOS 20 maintains a record of which of these keys are being pressed, typically by changing what is known as a "shift-state" byte. For all other keys, BIOS 20 translates the scan code by looking up the scan code, along with the record of which of the shift keys, special shift keys and toggle keys are currently being pressed, in look-up table 22. Look-up table 22 is also typically implemented within the ROM of a computer (e.g., computer 10 of FIG. 1), although the present invention is not so limited. After translating the scan code by looking it up in table 22, BIOS 20 executes the corresponding command. With respect to controlling CD-ROM audio functions, BIOS 20 signals CD-ROM player 24 to execute the audio function corresponding to a sequence of keystrokes inputted by the user and detected by controller 18.

Thus, the present invention as shown in FIG. 2 works as follows. Controller 18 detects a series of keystrokes entered on the keyboard and sends the scan codes corresponding to the keystrokes to BIOS 20. BIOS 20 translates the scan code by looking up the scan code, along with the record of which of the shift keys, special shift keys and toggle keys are also currently being pressed, in look-up table 22. If the keystrokes entered on the keyboard correspond to a CD-ROM audio function, then BIOS 20 signals CD-ROM player 24 to execute the audio function.

Figure 3:
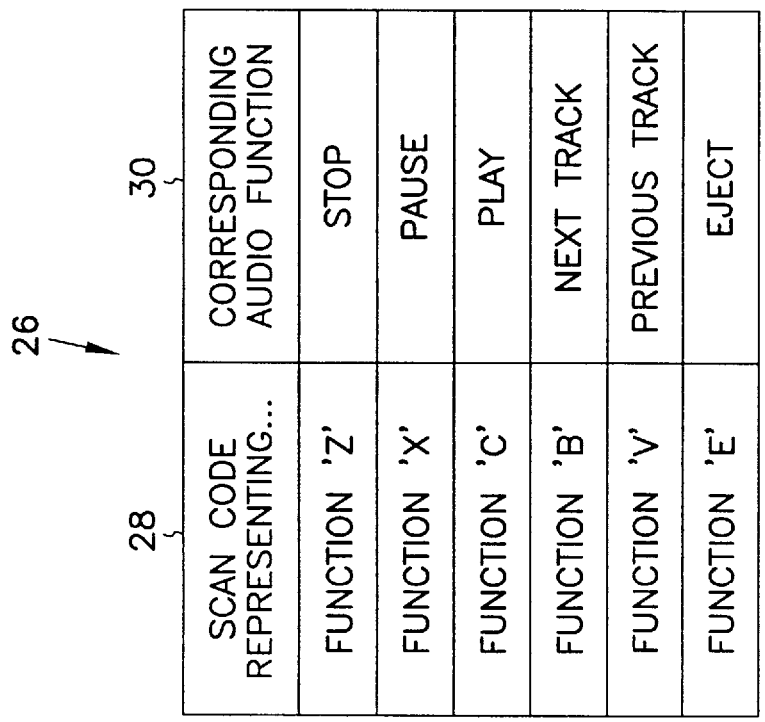
FIG. 3 is a diagram of one embodiment of a look-up table of a BIOS under the present invention; and, FIG. 4 is a block diagram of a further embodiment of the present invention.

The present invention is not limited to any particular set of keystrokes mapped to any particular set of CD-ROM audio functions. Any keystroke can be mapped to any audio function without departing from the scope of the present invention. One particular embodiment of keystroke to audio function mapping is shown in FIG. 3. This embodiment typically resides in the look-up table of the invention (e.g., look-up table 22 of FIG. 2). Table 26 includes columns 28 and 30, in which column 30 lists the audio functions corresponding to the keystrokes listed in column 28. Thus, the BIOS would look up the scan code representing a particular sequence of keystrokes in column 28, and signal the CD-ROM player to execute the corresponding audio function in column 30.

For example, if the keystroke FUNCTION 'Z' is pressed (i.e., the function key is held down while the 'Z' key is pressed), the controller signals this information to the BIOS. The BIOS then looks up in the look-up table that this keystroke corresponds to the STOP audio function, and signals the CD-ROM player to execute the STOP audio function. The CD-ROM player then stops the compact disc inserted therein from playing. In a similar manner, the keystroke FUNCTION 'X' causes the CD-ROM player to pause the playing of compact disc under the present invention, the keystroke FUNCTION 'C' causes the CD-ROM to play the compact disc, etc. As those skilled in the art understand as well, keystrokes and audio functions other than those listed in table 26 of FIG. 3 can be implemented under the present invention without departing from the scope of the present invention. One example of such an audio function is direct-track addressing, which allows for a user to press a particular keystroke to immediately jump to a particular track on the CD. For example, FUNCTION '1' corresponds to the command for jumping to track one of the CD; FUNCTION '2' corresponds to the command for jumping to track two, etc. Another example of such an audio function is jumping to the next disk, or the previous disk, which are relevant commands in a multi-disk CD-ROM player.

As discussed in conjunction with FIG. 2 and FIG. 3, the present invention allows for a number of advantages. Because the present invention is implemented within the BIOS of a computer, the present invention is operating system independent. That is, as those skilled in the art understand, the BIOS of a computer is at a lower level within the computer's architecture than is the operating system. Any operating system implemented on a computer generally must interact with that computer's BIOS. By implementing keyboard control of audio functions within BIOS, the present invention is not tied to any one particular operating system, and can be used with any operating system.

Furthermore, because the present invention is implemented within the BIOS, it is typically compatible with existing stand-alone programs. Stand-alone programs are at a higher level within the computer architecture than operating systems, as those skilled in the art understand. A given program will access the operating system, which then accesses the BIOS, which then accesses the hardware. Because the present invention implements its functionality at a different (lower) level within the computer architecture as compared to stand-alone programs, the potential for incompatibility caused by the present invention is greatly reduced.

The present invention also allows for the advantage of not taking up precious base memory of a computer. In prior art solutions such as terminate-and-stay-resident programs, these programs are stored typically in the lowest 640 kilobytes of random-access memory of a computer. As those of ordinary skill in the art understand, this memory is frequently referred to as base memory, and is a scarce resource: significant functionality of the computer must reside within the base memory. By residing within the BIOS instead of a separate stand-alone program, the present invention allows for the conservation of this base memory.

In addition, the present invention allows for immediate and automatic functionality as soon as a user turns on the computer. As those skilled in the art understand, as soon as the computer is turned on, the BIOS thereof typically conducts a series of complex tests of all the hardware devices installed on the computer. This is known as Power-On Self Test (POST). After this self test is conducted, the operating system of the computer is then loaded. By the time the operating system is loaded the BIOS is already functioning; the functionality afforded by the present invention is available to the user automatically and immediately. The user does not have to load or otherwise start the present invention.

Finally, the present invention allows for keyboard control of the audio functions of a CD-ROM player to always be active. When an appropriate sequence of keystrokes is entered into the keyboard, the BIOS instructs the CD-ROM player to perform the corresponding function. Because the BIOS is lower level than the operating system or a stand-alone program, the BIOS instructs the CD-ROM player to perform a function before the operating system or a stand-alone program can act on the keystroke. Thus, entering in the predetermined keystrokes to control audio functionality (as exemplified in FIG. 3) permits such control regardless of what the operating system is doing, and regardless of what stand-alone program is running on the operating system.

Figure 4:
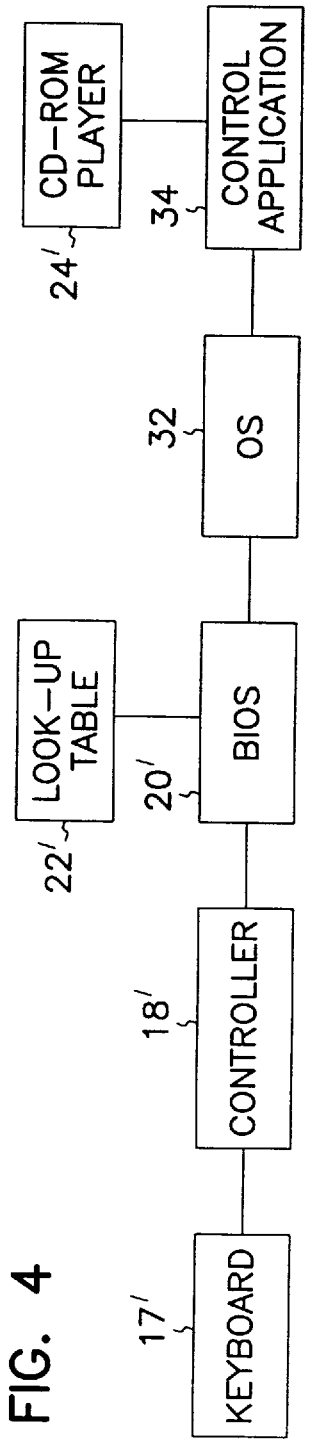

Referring now to FIG. 4, an alternative embodiment of the present invention is shown. Keyboard 17' is a keyboard, and corresponds to keyboard 17 of FIG. 2. Controller 18' is a keyboard controller, and corresponds to controller 18 of FIG. 2. Therefore, reference to the discussion of FIG. 2 should be made for further understanding thereto. Controller 18' typically is an integrated circuit (IC), such as the Intel 80C51SL. As discussed in conjunction with FIG. 2, the controller detects sequences of keystrokes entered on keyboard 17' and sends the corresponding scan codes to the BIOS. As shown in FIG. 4, controller 18' sends these scan codes to BIOS 20'. BIOS 20' is a Basic Input/Output System, which is a set of programs permanently installed in the ROM of a computer and which provides the most basic control and management of the computer's hardware. Alternatively, the BIOS is installed in the hard disk drive of the computer. BIOS 20' corresponds to BIOS 20 of FIG. 2. Therefore, reference to the discussion of FIG. 2 should be made for further understanding thereto.

Upon receiving a scan code from controller 18', BIOS 20' determines if the scan code corresponds to one of the ordinary shift keys or one of the keys that are considered to be special shift keys and toggle keys—CTRL, ALT, NUM LOCK, CAPS LOCK, SCROLL LOCK, FUNCTION, INSERT, etc., as has already been discussed in conjunction with BIOS 20 of FIG. 2. If the scan code corresponds to one of these special keys, BIOS 20' maintains a record of which of these keys are being pressed, typically by changing what is known as a "shift state" byte. For all other keys, as has been discussed in conjunction with BIOS 20 of FIG. 2, BIOS 20' translates the scan code by looking up the scan code along with the record of which of the special keys is being pressed in look-up table 22'. Look-up table 22' is also typically implemented within the ROM of a computer, and corresponds to table 22 of FIG. 2. Therefore, reference to the discussion in conjunction with FIG. 2 should be made for further understanding thereto.

The embodiment shown in FIG. 4 differs with that shown in FIG. 2 in what the BIOS does after it translates the scan code. In the embodiment shown in FIG. 2, the BIOS itself signals the CD-ROM player to execute the audio function corresponding to the sequence of keystrokes entered on the keyboard. Conversely, in the embodiment shown in FIG. 4, the BIOS sends a command from the look-up table corresponding to the scan code to operating system 32. The BIOS sends this command to operating system 32. Operating system 32 in one embodiment of the invention is Microsoft Windows 95 brand operating system and in another embodiment of the invention is Microsoft Windows 3.1 1 brand operating system. However, the invention is not limited to any particular operating system. Operating system 32 typically resides within the RAM of a computer, is permanently stored in the computer's storage device, and is executed by the computer's CPU.

Control application 34 receives the command from operating system 32. This is typically accomplished by control application 34 making what is known in the art as a "call" to the operating system, to receive keyboard input. Upon recognizing an appropriate command, control application 34 then signals CD-ROM player 24' to execute the audio function corresponding to the command, in a manner similar to how BIOS 20 of FIG. 2 signals CD-ROM player 24 of FIG. 2 to execute an audio function. Control application 34 is a software program usually residing in the RAM of the computer, and executed by the computer's CPU. However, the invention is not so limited, and the control application in another embodiment is hardware, and in yet a further embodiment is software residing in the ROM of the computer. CD-ROM player 24' corresponds to CD-ROM player 24 of FIG. 2, and reference to the discussion of FIG. 2 should be made for further understanding thereto. Player 24' in one embodiment is internal and resides within the computer, whereas in another embodiment of the invention is external to the computer.

Thus, the present invention as shown in FIG. 4 works as follows. Controller 18' detects a series of keystrokes entered on the keyboard and sends the scan codes corresponding to the keystrokes to BIOS 20'. BIOS 20' translates the scan codes into commands by looking them up, along with the record of which of the shift keys, special shift keys, and toggle keys are also currently being pressed, in look-up table 22'. The resulting commands are received by operating system 32, and from operating system 32 are received by control application 34. The commands correspond to a CD-ROM audio function, and the control application 34 signals CD-ROM player 24' to execute the appropriate audio function.

In one embodiment of the present invention, operating system 32 automatically loads control application 34 the first time operating system 32 receives a command from BIOS 20' corresponding to an audio function command for the CD-ROM player. That is, upon a user turning on the computer, control application 34 will not load until the user enters in a sequence of keystrokes corresponding to an audio function. In another embodiment of the invention, operating system 32 automatically loads control application 34 as soon as the computer has been turned on and operating system 32 has loaded into memory.

The embodiment of the present invention shown in FIG. 4 is not limited to any particular set of keystrokes mapped to any particular set of CD-ROM audio functions, as has been already discussed in conjunction with the embodiment shown in FIG. 2. Therefore, any keystroke can be mapped to any audio function without departing from the scope of the present invention. For example, the mapping shown in FIG. 3 is also applicable to the embodiment of the invention shown in FIG. 4. Note that the embodiment as shown in FIG. 4 is still dependent on the BIOS in that it receives commands from the BIOS through the operating system. However, the control application is more easily modified than the BIOS. Thus, should the CD-ROM player controlled by the present invention change in how it receives commands corresponding to audio functions, the embodiment shown in FIG. 4 can easily be modified to accommodate this.

Those of ordinary skill in the art will readily appreciate that many changes and modifications to the above drawings and description can be made without departure from the spirit or scope of the following claims. For example, the invention has been shown to utilize a specific set of keystroke sequences corresponding to a specific set of audio functions of a CD-ROM player. However, the invention could utilize other keystroke sequences without departing from the scope of the claims. Further, the invention can be modified to control a different set of audio functions of a CD-ROM player, also without departing from the scope of the following claims.

I claim:

1. A computerized system for keyboard control of compact disc-read only memory (CD-ROM) audio of a computer, the computer comprising:

a CD-ROM player receptive to an audio compact disc (CD);

a computer keyboard having a plurality of keys for entry of one or more predetermined sequences of one or more keystrokes by a user of the computer, each predetermined sequence corresponding to an audio function of the CD-ROM player; and, a basic input/output system (BIOS) operatively coupled to the CD-ROM player and the keyboard, the BIOS in response to detecting a predetermined sequence of keystrokes entered by the user on the keyboard operatively signaling the CD-ROM player to execute a corresponding audio function.

2. The computerized system of claim 1, the computer further comprising:

an operating system;

a compact disc-read only memory (CD-ROM) control application executed by the operating system;

wherein the BIOS signals the CD-ROM player by sending a command to the operating system in response to detecting the predetermined sequence of keystrokes entered by the user on the keyboard, the command ultimately received by the CD-ROM control application executed by the operating system for signaling the CD-ROM player to execute the corresponding audio function.

3. The computerized system of claim 2, wherein the operating system automatically launches the CD-ROM control application upon insertion of a CD into the CD-ROM player.

4. The computerized system of claim 1, wherein a different predetermined sequence of keystrokes corresponds to each audio function of the group of audio functions comprising: eject, pause, stop, play, go to next track, and go to previous track.

5. The computerized system of claim 4, wherein the keyboard has a key corresponding to each letter of the alphabet and a function key, the sequence of keystrokes comprising the function key and the 'e' key corresponding to the eject audio function, the sequence of keystrokes comprising the function key and the 'z' key corresponding to the stop audio function, the sequence of keystrokes comprising the function key and the 'x' key corresponding to the pause audio function, the sequence of keystrokes comprising the function key and the 'c' key corresponding to the play audio function, the sequence of keystrokes comprising the function key and the 'b' key corresponding to the next track audio function, and the sequence of keystrokes comprising the function key and the 'v' key corresponding to the previous track audio function.

6. The computerized system of claim 4, wherein the group of audio functions further comprises: fast forward and fast backward.

7. The computerized system of claim 4, wherein the CD-ROM player is a multi-disk CD-ROM player, and the group of audio functions further comprises: next disk and previous disk.

8. The computerized system of claim 4, the CD having a plurality of audio tracks, wherein a different predetermined sequence of keystrokes corresponds to an audio function for direct track addressing of each audio track of the CD.

9. A basic input/output system (BIOS) for keyboard control of compact discread only memory (CD-ROM) audio of a computer, operatively coupled to a CD-ROM player receptive to an audio compact disc (CD) and to a computer keyboard having a plurality of keys for entry of one or more predetermined sequences of one or more keystrokes by a user of the computer, each predetermined sequence corresponding to an audio function of the CD-ROM player, the BIOS comprising:

detecting means for detecting a predetermined sequence of keystrokes entered by the user on the keyboard; and, signaling means for operatively signaling the CD-ROM player to execute the audio function corresponding to the predetermined sequence detected by the detecting means.

10. The BIOS of claim 9, wherein the BIOS is executed from a random-access memory (RAM) of the computer.

11. The BIOS of claim 9, wherein the BIOS is stored on an integrated-circuit (IC) chip of the computer.

12. The BIOS of claim 9, wherein the BIOS is stored on a hard disk drive (HDD) of the computer.

13. The BIOS of claim 9, wherein the signaling means signals the CD-ROM player by sending a command to an operating system of the computer in response to the detecting means detecting a predetermined sequence of keystrokes entered by the user on the keyboard, the command ultimately received by a compact disc-read only memory (CD-ROM) control application executed by the operating system for signaling the CD-ROM player to execute the corresponding audio function.

14. The BIOS of claim 13, wherein the operating system automatically launches the CD-ROM control application upon insertion of a CD into the CD-ROM player.

15. The BIOS of claim 9, wherein a different predetermined sequence of keystrokes corresponds to each audio function of the group of audio functions comprising: eject, pause, stop, play, go to next track, and go to previous track.

16. The BIOS of claim 15, wherein the keyboard has a key corresponding to each letter of the alphabet and a function key, the sequence of keystrokes comprising the function key and the 'e' key corresponding to the eject audio function, the sequence of keystrokes comprising the function key and the 'z' key corresponding to the stop audio function, the sequence of keystrokes comprising the function key and the 'x' key corresponding to the pause audio function, the sequence of keystrokes comprising the function key and the 'c' key corresponding to the play audio function, the sequence of keystrokes comprising the function key and the 'b' key corresponding to the next track audio function, and the sequence of keystrokes comprising the function key and the 'v' key corresponding to the previous track audio function.

17. The BIOS of claim 15, wherein the group of audio functions further comprises fast forward and fast backward.

18. The BIOS of claim 15, wherein the CD-ROM player is a multi-disk CD-ROM player, and the group of audio functions further comprises: next disk and previous disk.

19. The BIOS of claim 15, the CD having a plurality of audio tracks, wherein a different predetermined sequence of keystrokes corresponds to an audio function for direct track addressing of each audio track of the CD.

20. A method for keyboard control of compact disc-read only memory (CD-ROM) audio of a computer having a CD-ROM player and a computer keyboard, the CD-ROM player receptive to an audio compact disc (CD), the computer keyboard having a plurality of keys for entry of one or more predetermined sequences of one or more keystrokes by a user of the computer, each predetermined sequence corresponding to an audio function of the CD-ROM player, the method comprising the steps of:

detecting a predetermined sequence of keystrokes entered by the user on the keyboard; and, operatively signaling the CD-ROM player to execute the audio function corresponding to the detected predetermined sequence;

wherein the step of detecting and the step of operatively signaling are performed by a basic input/output system (BIOS) operatively coupled to the CD-ROM player and the keyboard.

21. The method of claim 20, wherein the step of operatively signaling the CD-ROM player to execute the audio function corresponding to the detected predetermined sequence further comprises the steps of:

sending a command to an operating system of the computer;

sending the command from the operating system to a compact disc-read only memory (CD-ROM) control application executed by the operating system for signaling the CD-ROM player to execute the corresponding audio function.

22. The method of claim 20, wherein a different predetermined sequence of keystrokes corresponds to each audio function of the group of audio functions comprising: eject, pause, stop, play, go to next track, and go to previous track.

23. The method of claim 22, wherein the keyboard has a key corresponding to each letter of the alphabet and a function key, the sequence of keystrokes comprising the function key and the 'z' key corresponding to the stop audio function, the sequence of keystrokes comprising the function key and the 'x' key corresponding to the pause audio function, the sequence of keystrokes comprising the function key and the 'c' key corresponding to the play audio function, the sequence of keystrokes comprising the function key and the 'b' key corresponding to the next track audio function, and the sequence of keystrokes comprising the function key and the 'v' key corresponding to the previous track audio function.

24. The method of claim 22, wherein the group of audio functions further comprises fast forward and fast backward.

25. The method of claim 22, wherein the CD-ROM player is a multi-disk CD-ROM player, and the group of audio functions further comprises: next disk and previous disk.

26. The method of claim 22, the CD having a plurality of audio tracks, wherein a different predetermined sequence of keystrokes corresponds to an audio function for direct track addressing of each audio track of the CD.

27. A computer having keyboard control of compact-disc read only memory (CD-ROM) audio, the computer operatively coupled to a CD-ROM player receptive to an audio compact disc (CD) and to a computer keyboard having a plurality of keys for entry of one or more predetermined sequences of one or more keystrokes by a user of the computer, the computer comprising:

a storage device; and, a basic input/output system (BIOS) residing within the storage device, the BIOS in response to detecting a predetermined sequence of keystrokes entered by the user on the keyboard operatively signaling the CD-ROM player to execute a corresponding audio function.

28. The computer of claim 27, the computer further comprising a random-access memory (RAM) and the BIOS is executed from the RAM.

29. The computer of claim 27, wherein the storage device is a hard disk drive (HDD).

30. The computer of claim 27, wherein the storage device is a read-only memory (ROM).

31. The computer of claim 27, further comprising:

a central processing unit (CPU);

a random-access memory (RAM);

an operating system, residing within the storage device and executed by the CPU; and, a compact disc-read only memory (CD-ROM) control application residing with the RAM and executed by the operating system;

wherein the BIOS signals the CD-ROM player by sending a command to the operating system in response to detecting the predetermined sequence of keystrokes entered by the user on the keyboard, the command ultimately received by the CD-ROM control application and in response the CD-ROM control application signaling the CD-ROM player to execute the corresponding audio function.

32. The computerized system of claim 31, wherein the operating system automatically launches the CD-ROM control application upon insertion of a CD into the CD-ROM player.

33. The computer of claim 27, wherein a different predetermined sequence of keystrokes corresponds to each audio function of the group of audio functions comprising eject, pause, stop, play, go to next track, and go to previous track.

34. The computer of claim 33, wherein the keyboard has a key corresponding to each letter of the alphabet and a function key, the sequence of keystrokes comprising the function key and the 'e' key corresponding to the eject audio function, the sequence of keystrokes comprising the function key and the 'z' key corresponding to the stop audio function, the sequence of keystrokes comprising the function key and the 'x' key corresponding to the pause audio function, the sequence of keystrokes comprising the function key and the 'c' key corresponding to the play audio function, the sequence of keystrokes comprising the function key and the 'b' key corresponding to the next track audio function, and the sequence of keystrokes comprising the function key and the 'v' key corresponding to the previous track audio function.

35. The computer of claim 33, wherein the group of audio functions further comprises fast forward and fast backward.

36. The computer of claim 33, wherein the CD-ROM player is a multi-disk CD-ROM player, and the group of audio functions further comprises next disk and previous disk.

37. The computer of claim 33, the CD having a plurality of audio tracks, wherein a different predetermined sequence of keystrokes corresponds to an audio function for direct track addressing of each audio track of the CD.

38. A computer-readable storage medium having a BIOS computer program executable on a suitably configured computer, the computer having a CD-ROM player receptive to an audio compact disc (CD) and a computer keyboard having a plurality of keys for entry of one or more predetermined sequences of one or more keystrokes by a user of the computer, each predetermined sequence corresponding to an audio function of the CD-ROM player, the computer program comprising:

detecting means for detecting a predetermined sequence of keystrokes entered by the user on the keyboard; and, signaling means for operatively signaling the CD-ROM player to execute the audio function corresponding to the predetermined sequence detected by the detecting means.

39. The storage medium of claim 38, wherein the signaling means signals the CD-ROM player by sending a command to an operating system of the computer in response to the detecting means detecting a predetermined sequence of keystrokes entered by the user on the keyboard, the command ultimately received by a compact disc-read only memory (CD-ROM) control application executed by the operating system for signaling the CD-ROM player to execute the corresponding audio function.

40. The storage medium of claim 39, wherein the operating system automatically launches the CD-ROM control application upon insertion of a CD into the CD-ROM player.

41. The storage medium of claim 38, wherein a different predetermined sequence of keystrokes corresponds to each audio function of the group of audio functions comprising: eject, pause, stop, play, go to next track, and go to previous track.

42. The storage medium of claim 41, wherein the keyboard has a key corresponding to each letter of the alphabet and a function key, the sequence of keystrokes comprising the function key and the 'e' key corresponding to the eject audio function, the sequence of keystrokes comprising the function key and the 'z' key corresponding to the stop audio function, the sequence of keystrokes comprising the function key and the 'x' key corresponding to the pause audio function, the sequence of keystrokes comprising the function key and the 'c' key corresponding to the play audio function, the sequence of keystrokes comprising the function key and the 'b' key corresponding to the next track audio function, and the sequence of keystrokes comprising the function key and the 'v' key corresponding to the previous track audio function.

43. The storage medium of claim 41, wherein the group of audio functions further comprises fast forward and fast backward.

44. The storage medium of claim 41, wherein the CD-ROM player is a multidisk CD-ROM player, and the group of audio functions further comprises next disk and previous disk.

45. The storage medium of claim 41, the CD having a plurality of audio tracks, wherein a different predetermined sequence of keystrokes corresponds to an audio function for direct track addressing of each audio track of the CD.

* * * * *